Patented Jan. 13, 1948

2,434,539

UNITED STATES PATENT OFFICE 2,434,539

LUBRICANTS

Alan Beerbower, Westfield, and Arnold J. Morway, Clark Township, Union County, N. J., assignors to Standard Oil Development Company, a corporation of Delaware No Drawing. Application December 22, 1945, Serial No. 637,033

17 Claims. (Cl. 252—41)

The present invention relates to lubricants, more particularly to lubricants of a grease consistency and specifically to a method and means for improving continuous grease - producing processes. Furthermore, the present invention is especially directed to the adaptation of the principles of continuous grease-producing processes to those greases which contain as bodying or thickening agents metal soaps resulting from the neutralization of high molecular weight fatty acids with a strong metal hydroxide, the strong metal hydroxide being characterized by being crystalline in form and having one or more molecules of water of crystallization or water of combination.

The production of greases was looked upon for many years as being restricted to batch processes. However, recently processes for the continuous production of grease have been developed. Generally speaking, continuous grease-making processes involve making up a mineral oil solution of a high molecular weight fatty acid or of an acid having the property of producing oil-thickening soaps when neutralized by an alkali, separately making up a suspension of alkali in mineral lubricating oil and feeding measured amounts of the acid solution and alkali suspension to a reactor, generally a mechanical mixer of the colloid mill type and heating to a temperature sufficient to dissolve the soap resulting from the reaction between the acid and the alkali in the mineral lubricating oil. The reactants are continuously fed to the reaction chamber and the hot grease is continuously removed at a rate which permits sufficient time for the reaction between the acid and the alkali and thorough mixing of the oil and the reaction products.

Many valuable greases have been made by batch processes from mineral lubricating oil and the soaps of high molecular weight fatty acids and metals which form strong metal hydroxides having one or more molecules of water of crystallization. Attempts to adapt continuous grease-making processes to greases of this type have not proved successful for several reasons. One reason is that compositions of mineral lubricating oil and soaps of this type become thick and gummy and practically unworkable within a range of temperatures just below the temperature at which the soap dissolves in the oil. This peculiarity places an undue burden upon the mixer which causes frequent breakdowns. Another cause for the inability to process these greases continuously is that these metal hydroxides, in addition to the water of crystallization, have a coating of unreactive salt, which may be the carbonate of the metal surrounding the hydroxide which renders the hydroxide inaccessible and therefore suspensions of the hydroxide in mineral oil are incapable of reacting with soap-forming fatty acids. In the batch processes, the metal hydroxides were made reactive by dissolving them in water in the form of a 10% solution which was then used to neutralize the fatty acid. It is not feasible however, especially in view of the cost considerations, to use dilute aqueous solutions of metal hydroxides in continuous grease-producing processes, because of the cost and difficulty due to frothing involved in evaporating copious quantities of water.

The principal object of the present invention is an improved continuous process for making anhydrous greases containing soaps of metals that form strong hydroxides which have at least one molecule of water of crystallization. Another object is to make such strong metal hydroxides more reactive to high molecular weight organic fatty acids. These and other objects will be apparent to those skilled in the art upon reading the following description.

It has now been found that the strong metal hydroxides of metals such as lithium, barium, and strontium, i. e., $Li(OH)_2 \cdot H_2O$, $Ba(OH)_2 \cdot 8H_2O$, and $Sr(OH)_2 \cdot 8H_2O$, may be made more reactive to high molecular weight organic fatty acids by heating the metal hydroxide crystals in the presence of a liquid hydrocarbon to a temperature and for a time sufficient to drive off all water of crystallization. The liquid hydrocarbon should be chosen with a boiling point substantially above the temperature at which the hydroxide is to be dehydrated, namely 225–350° F., and is preferably a mineral lubricating oil of the same type and grade to be used in making the grease. In the case of lithium hydroxide monohydrate it is preferred to dehydrate at a temperature of about 300° F. At least sufficient oil or other liquid hydrocarbon is used to yield a fluid slurry or suspension of strong metal hydroxide in the oil after the metal hydroxide has been completely dehydrated. The ratio of oil or liquid hydrocarbon to metal hydroxide on a parts by weight basis will range from 0.5 part of oil to one part hydroxide to 10 or more parts of oil to one part hydroxide. If difficulty is encountered in obtaining permanent suspension of the dehydrated hydroxide in the oil, a small amount of a free fatty acid, such as oleic, naphthenic or a 50/50 mixture of oleic and naphthenic acids may be added to the oil-hydroxide mixture prior to dehydration. During the dehydration step the small amount of acid will react with a portion of the hydroxide to form a soap, which will prevent phase separation between the hydroxide and oil on standing. The amount of acid added need not exceed about 2 parts by weight and as little as 0.5 part by weight may be used, although it is preferred to use about 1 part by weight for each 100 parts of total oil and hydroxide charged.

The following will illustrate the procedure used in making a hydroxide paste or slurry which may subsequently be used in a continuous grease making process:

| | Per cent |
|---|---|
| LiOH·H$_2$O | 50 |
| Lubricating oil | 49 |
| Oleic acid | 1 |

100 pounds of these materials were placed in a steam-jacketed kettle equipped with a stirrer and heated to 300° F. with stirring until all water was completely driven out. Dehydration was complete at the end of 1½ hours. The mass of the materials will control the time required for substantially complete dehydration, larger admixtures requiring more time than smaller. The dehydration step is considered to be complete when no more steam is seen to rise from the kettle. While a specific temperature of 300° F. is mentioned above, and a broader range of 225° to 350° F. has been indicated for the dehydration step, a range of 275° to 325° F. is normally considered preferable.

In the continuous process of the present invention a high molecular weight organic fatty acid is dissolved in mineral lubricating oil, utilizing heating and stirring if necessary. The acids are preferably stearic acid or hydrogenated fish oil acids although any of the acids customarily used in making oil-thickening soaps may be used. The amount of acid dissolved in the oil will be controlled by the amount of soap desired in the final grease which also will vary in accordance with the consistency of the grease to be made. Customarily the lithium, barium and strontium soap greases will contain from about 6 to about 30% of soap.

Although any of the numerous types of low pour point lubricating oils may be used, according to the present invention, it is preferred to use a Coastal type oil having a viscosity in the range of from about 58 seconds to 100 seconds S. U. V. at 100° F. and a cold test below 40° F. After the acid is completely dissolved in the oil, the acid-oil solution is metered to the reactor (mixer), maintained at a temperature above the melting point of the soap formed in the reactor and simultaneously therewith hydroxide slurry, obtained as previously described, is metered into the reactor in an amount sufficient to neutralize the fatty acid in the acid oil solution. After the reaction is complete, the hot grease can be continuously removed from the reactor and cooled. If desired, the hot grease can be filtered as it leaves the reactor or it may be filtered after cooling. Additional ingredients such as antioxidants, inhibitors (e. g., phenyl-α-naphthylamine) and crystallization modifiers (e. g., zinc naphthenate) can be incorporated in the grease if desired at the time the hot grease leaves the reactor.

Alternatively, the fatty acid, with or without the addition of up to an equal weight of oil, may be heated to a temperature above the melting point of the soap to be formed, in a batch reactor. The hydroxide slurry is then fed slowly (in about 1–5 minutes) to the reactor, allowing the water of reaction to escape. The resulting fluid, molten soap is then blended continuously with an oil at essentially the same temperature, and the mixture cooled. It may be filtered before or after cooling.

What is claimed is:

1. A continuous method for producing anhydrous greases which comprises first forming a slurry of dehydrated metal hydroxide in lubricating oil by heating a mixture of at least partially hydrated metal hydroxide and said oil to a temperature range of above 225° F., to substantially dehydrate said metal hydroxide, said hydrated metal hydroxide being selected from the group consisting of LiOH·H$_2$O, Ba(OH)$_2$·8H$_2$O and Sr(OH)$_2$·8H$_2$O next reacting said slurry with hot high molecular weight fatty acid at a temperature at which the soap formed by the reaction of said metal hydroxide with said fatty acid will remain dissolved in the oil, and finally cooling the reaction mass to form a grease.

2. A continuous method for producing anhydrous greases which comprises dissolving a high molecular weight fatty acid in mineral lubricating oil; separately forming a slurry of dehydrated metal hydroxide in lubricating oil by heating a mixture of at least partially hydrated metal hydroxide and said oil to a temperature range of 275° to 325° F., to substantially dehydrate said metal hydroxide, said metal hydroxide being selected from the group consisting of LiOH·H$_2$O, Ba(OH)$_2$·8H$_2$O and Sr(OH)$_2$·8H$_2$O and reacting said oil solution of high molecular weight fatty acid with said slurry of metal hydroxide at a temperature at which the soap formed by the reaction will remain dissolved in the oil and cooling the reaction mass to form a grease.

3. A continuous method for producing anhydrous greases which comprises dissolving a high molecular weight fatty acid in mineral lubricating oil; separately dehydrating a hydrated lithium hydroxide by heating it with mineral oil to substantially remove combined moisture, thereby forming a slurry of dehydrated lithium hydroxide in lubricating oil and reacting said oil solution of high molecular weight fatty acid with said slurry of lithium hydroxide at a temperature at which the lithium fatty acid soap will remain dissolved in the oil and cooling the reaction mass to form a grease.

4. A continuous method for producing anhydrous greases which comprises dissolving a high molecular weight fatty acid in mineral lubricating oil; separately forming a slurry of dehydrated lithium hydroxide in lubricating oil by heating lithium hydroxide monohydrate, lubricating oil and a small amount of an acid selected from the group consisting of an oleic acid, naphthenic acid and mixtures thereof, to a temperature within the range 275–325° F. until complete dehydration is obtained; and reacting said oil solution of high molecular weight fatty acid with said slurry of lithium hydroxide at a temperature at which the lithium hydroxide fatty acid soap will remain dissolved in the oil and cooling the reaction mass to form a grease.

5. A continuous method for producing anhydrous greases which comprises dissolving a high molecular weight fatty acid in mineral lubricating oil; separately forming a slurry of dehydrated lithium hydroxide in lubricating oil by heating lithium hydroxide monohydrate, lubricating oil and a small amount of oleic acid, to a temperature within the range 275–325° F. until complete dehydration is obtained; and reacting said oil solution of high molecular weight fatty acid with said slurry of lithium hydroxide at a temperature at which the lithium hydroxide fatty acid soap will remain dissolved in the oil and cooling the reaction mass to form a grease.

6. A continuous method for producing anhydrous greases which comprises dissolving a high molecular weight fatty acid in mineral lubricating oil; separately forming a slurry of dehydrated lithium hydroxide in lubricating oil by heating relatively large quantities of lithium hydroxide monohydrate, and lubricating oil and a small amount of naphthenic acid, to a temperature within the range 275–325° F. until complete dehydration is obtained; and reacting said oil solution of high molecular weight fatty acid with said slurry of lithium hydroxide at a temperature at which the lithium hydroxide fatty acid soap will remain dissolved in the oil and cooling the reaction mass to form a grease.

7. A continuous method for producing anhydrous greases which comprises dissolving a high molecular weight fatty acid in mineral lubricating oil; separately forming a slurry of dehydrated lithium hydroxide in lubricating oil by heating relatively large quantities of lithium hydroxide monohydrate, and lubricating oil and a small quantity of a 50/50 mixture of oleic and naphthenic acids, to a temperature within the range 275–325° F. until complete dehydration is obtained; and reacting said oil solution of high molecular weight fatty acid with said slurry of lithium hydroxide at a temperature at which the lithium hydroxide fatty acid soap will remain dissolved in the oil and cooling the reaction mass to form a grease.

8. A continuous method for producing anhydrous greases which comprises dissolving a high molecular weight fatty acid in mineral lubricating oil; separately forming a slurry of dehydrated lithium hydroxide in lubricating oil by heating 50 parts by weight lithium monohydrate, 49 parts by weight lubricating oil and 1 part by weight of an acid selected from the group consisting of oleic acid, naphthenic acid and mixtures thereof to a temperature of 300° F. until complete dehydration is obtained; and reacting said oil solution of high molecular weight fatty acid with said slurry of lithium hydroxide at a temperature at which the lithium hydroxide fatty acid soap will remain dissolved in the oil and cooling the reaction mass to form a grease.

9. A continuous method for producing anhydrous greases which comprises dissolving a high molecular weight fatty acid in mineral lubricating oil; separately forming a slurry of dehydrated lithium hydroxide in lubricating oil by heating 50 parts by weight lithium monohydrate, 49 parts by weight lubricating oil and 1 part by weight of oleic acid to a temperature of 300° F. until complete dehydration is obtained; and reacting said oil solution of high molecular weight fatty acid with said slurry of lithium hydroxide at a temperature at which the lithium hydroxide fatty acid soap will remain dissolved in the oil and cooling the reaction mass to form a grease.

10. A continuous method for producing anhydrous greases which comprises dissolving a high molecular weight fatty acid in mineral lubricating oil; separately forming a slurry of dehydrated lithium hydroxide in lubricating oil by heating 50 parts by weight lithium monohydrate, 49 parts by weight lubricating oil and 1 part by weight of naphthenic acid to a temperature of 300° F. until complete dehydration is obtained; and reacting said oil solution of high molecular weight fatty acid with said slurry of lithium hydroxide at a temperature at which the lithium hydroxide fatty acid soap will remain dissolved in the oil and cooling the reaction mass to form a grease.

11. A continuous method for producing anhydrous greases which comprises dissolving a high molecular weight fatty acid in mineral lubricating oil; separately forming a slurry of dehydrated lithium hydroxide in lubricating oil by heating 50 parts by weight lithium monohydrate, 49 parts by weight lubricating oil and 1 part by weight of a 50/50 mixture of oleic and naphthenic acids to a temperature of 300° F. until complete dehydration is obtained; and reacting said oil solution of high molecular weight fatty acid with said slurry of lithium hydroxide at a temperature at which the lithium hydroxide fatty acid soap will remain dissolved in the oil and cooling the reaction mass to form a grease.

12. A composition of matter consisting essentially of a slurry of dehydrated and activated metal hydroxide selected from the group consisting of LiOH, Ba(OH)$_2$, and Sr(OH)$_2$ in lubricating oil, said slurry being dehydrated and activated by heating the hydroxide in said lubricating oil to a temperature above 225° F. for a time sufficient to substantially remove moisture combined with said hydroxide.

13. A composition of matter consisting essentially of a slurry of dehydrated and activated LiOH in lubricating oil, said slurry being dehydrated and activated by heating the hydroxide in said lubricating oil to a temperature above 225° F. for a time sufficient to substantially remove moisture combined with said hydroxide.

14. A composition of matter consisting essentially of a slurry of substantially similar quantities of dehydrated and activated metal hydroxide selected from the group consisting of LiOH, Ba (OH)$_2$, and Sr(OH)$_2$ and lubricating oil and a relatively very small amount of the soap formed by the reaction of the metal hydroxide and a fatty acid selected from the group consisting of oleic acid, naphthenic acid and mixtures thereof, said slurry being dehydrated and activated by heating the hydroxide in said lubricating oil to a temperature above 225° F. for a time sufficient to substantially remove moisture combined with said hydroxide.

15. As a composition of matter dehydrated activated lithium hydroxide, lubricating oil and a relatively very small amount of the lithium soap of oleic acid, said slurry being dehydrated and activated by heating the hydroxide in said lubricating oil to a temperature above 225° F. for a time sufficient to substantially remove moisture combined with said hydroxide.

16. As a composition of matter dehydrated activated lithium hydroxide, lubricating oil and a relatively very small amount of the lithium soap of naphthenic acid, said slurry being dehydrated and activated by heating the hydroxide in said lubricating oil to a temperature above 225° F. for a time sufficient to substantially remove moisture combined with said hydroxide.

17. As a composition of matter substantially equal parts by weight of dehydrated activated lithium hydroxide, and lubricating oil and a relatively very small amount of a 50/50 mixture of lithium oleate and lithium napthenate, said slurry being dehydrated and activated by heating the hydroxide in said lubricating oil to a temperature above 225° F. for a time sufficient to substantially remove moisture combined with said hydroxide.

ALAN BEERBOWER.
        ARNOLD J. MORWAY.

REFERENCES CITED

The following references are of record in the file of this patent:

UNITED STATES PATENTS

| Number    | Name         | Date          |
|-----------|--------------|---------------|
| 2,383,904 | Zimmer       | Aug. 28, 1945 |
| 2,383,906 | Zimmer et al.| Aug. 28, 1945 |
| 2,394,907 | Gallay et al.| Feb. 12, 1946 |

OTHER REFERENCES

Klemgard, Lubricating Greases, pub. 1937, by Reinhold Pub. Co. of New York, pages 341 and 344.